United States Patent Office 2,759,688
Patented Aug. 21, 1956

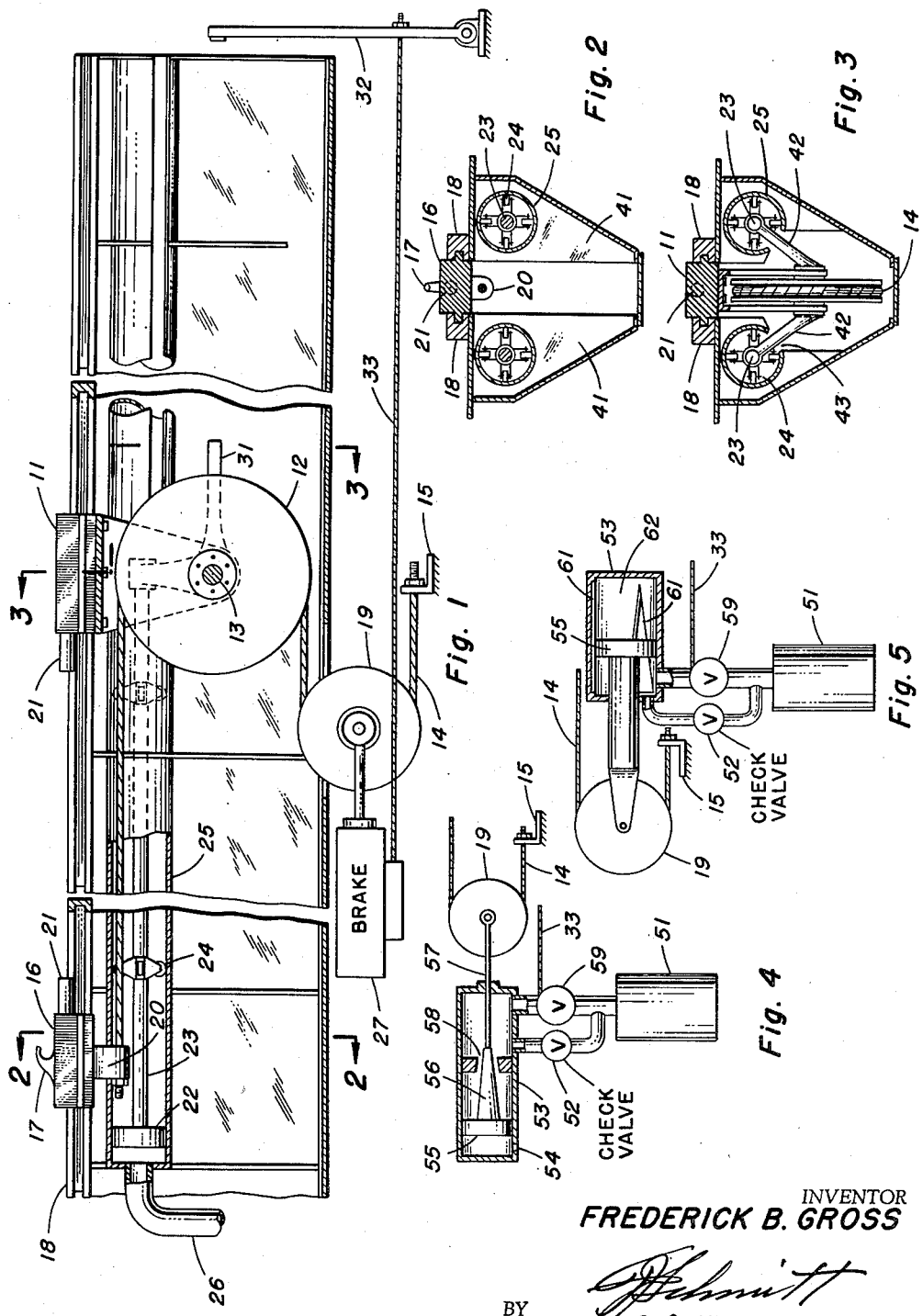

2,759,688

AIRPLANE CATAPULT

Frederick B. Gross, McLean, Va.

Application January 21, 1955, Serial No. 483,449

9 Claims. (Cl. 244—63)

(Granted under Title 35, U. S. Code (1952), sec. 266)

The invention described herein may be manufactured and used by or for the Government of the United States of America for governmental purposes without the payment of any royalties thereon or therefor.

The present relates to an improved airplane catapult and more particularly to an improved airplane catapult in which the moving parts are arrested at one-half the launching speed.

The development of high speed aircraft has introduced launching problems that did not exist or existed to an insignificant degree in the launching of prior relatively low speed aircraft. High speed aircraft require high speed launchings before they can become air-borne. This requirement of the aircraft necessitates additional requirements in regard to the launching machinery: viz., that it have moving parts capable of great acceleration and that adequate braking elements be provided to arrest the high velocity moving parts at the end of the acceleration run. Prior catapults have employed high energy sources and utilizers to obtain the great acceleration and complicated braking machinery to attain sufficient arresting. The space and weight requirements, and the initial and maintenance cost of these prior catapults are factors which it would be of advantage to diminish.

The present invention has a main ram crosshead which is moved by suitable means at one-half the launching speed. A launching cable is reeved over a sheave on the crosshead and connected at one end to a launching shuttle and at the other end to some stationary object to provide a dead end. It is evident that although the crosshead is moved at only one-half the launching speed, due to the cable-sheave speed multiplying arrangement the shuttle is moved at the full launching speed. The crosshead and shuttle are placed on the same line with the crosshead one-half the distance along the accelerated run. Since the shuttle is moved at twice the speed and must travel twice the distance of the crosshead, the shuttle makes contact with the crosshead at the end of the accelerated run. A brake is provided on the crosshead to brake the shuttle when contact is made. Thus, the shuttle is arrested at the speed difference between the shuttle and the crosshead which is one-half the launching speed. Another feature, inherent in this arrangement, is that less and less launching cable is accelerated as the run progresses and at the end of the run practically all of the launching cable has automatically come to rest. Since relatively low masses are accelerated at the full launching speed and the speed at which the masses are arrested is only one-half the launching speed, simple, small and inexpensive components can be employed in the present catapult to accomplish the accelerating and arresting processes.

Accordingly an object of the present invention is the provision of a high speed catapult that employs low mass moving components.

Another object of the present invention is to provide a high speed catapult having low mass moving components that are arrested at less than the full launching speed.

A still further object of the present invention is the provision of a high speed catapult having low mass moving components that are arrested at one-half the full launching speed.

Other objects and many of the attendant advantages of this invention will be readily appreciated as the same becomes better understood by reference to the following detailed description when considered in connection with the accompanying drawings wherein:

Fig. 1 shows a vertical sectional view of a preferred embodiment of the invention.

Fig. 2 illustrates a section of the device taken on the lin 2—2 of Fig. 1 looking in the direction of the arrows.

Fig. 3 shows a section of the device taken on the line 3—3 of Fig. 1 looking in the direction of the arrows.

Fig. 4 illustrates a schematic view, partly in section, of one brake that is suitable for use in this invention.

Fig. 5 shows a schematic view, partly in section, of another brake that is suitable for use in this invention.

Referring now to the drawings, wherein like reference characters designate like or corresponding parts throughout the several views, there is shown in Fig. 1 a main ram crosshead 11 on which there is mounted a sheave 12 and axle 13. A launching cable 14 is reeved over sheave 12 and has a dead end provided at 15. The other end of the cable is connected by a shuttle lug 20 to a projection possessing means comprising a shuttle 16 which has a projection 17 over which the airplane towing bridle is placed during a launching operation. Crosshead 11 and shuttle 16 travel in a track arrangement 18 having a length equal to that of the accelerated run plus the length required for the brake run, shuttle, etc. Buffers 21 of any suitable type, e. g. hydraulic or the friction type, are provided on the shuttle 16 and crosshead 11 to arrest the movement of shuttle 16 at the end of the run. The crosshead can be driven by many known energy sources. The conventional system shown in Fig. 1 is a piston drive mechanism consisting of a piston 22 connected by a rod 23 to crosshead 11. Rod 23 is supported on rollers 24 in cylinder 25. A liquid or a gas pressure system, not shown, is connected by pipe 26 to the cylinder 25 to provide the driving force. A main brake 27 is used to move the shuttle 16 forward by means of sheave 19 to tension the airplane towing bridle and entire cable system at the beginning of the run and to brake the crosshead 11 and attached parts at the end of the run. Arm 31 on crosshead 11 contacts bar 32 at the end of the run which, by means of cable 33, activates brake 27. As can be seen from Fig. 2 the piston drive mechanism consists of two units, one on each side of the crosshead. While a device of this type has proved effective for this purpose, other drive mechanisms can be used within the scope of the invention and the invention is not to be construed as limited by the disclosure of this particular device. Brackets 41 support cylinders 25 at various points along the acceleration run. Track arrangement 18 holds shuttle 16 in a conventional sliding arrangement. In Fig. 3, crosshead 11 is shown connected to piston rods 23 by arms 42 through slots 43 in cylinders 25. In Fig. 4 there is illustrated just one type of main brake 27 that could be employed in this system. Tank 51 contains a liquid under gas' pressure. Check valve 52 passes liquid from tank 51 to cylinder 53, shown in section, which has a vent 54 for allowing free movement of piston 55. The piston 55 is connected by a tapered sleeve 56 and rod 57 to sheave 19. An orifice 58 coacts with tapered sleeve 56 to give the desired braking action. At the end of a run, cable 33 triggers quick-opening valve 59 to allow liquid to pass from cylinder 53 to tank 51. In Fig. 5, which illustrates another suitable type of main brake, tapered orifice 61 is contained in the cylinder wall of cylinder 53 and is an escape path for liquid in chamber 62, otherwise the brake is the same as in Fig. 4. Many brakes would be suitable for main brake 27 including electric and friction brakes, the specific brakes shown are merely illustrative of types that could be utilized with this system, but it is to be understood that the system is adaptable to the use of many types of brakes.

At the start of launch the launching shuttle 16 is located one-half the accelerated run aft of crosshead 11. The airplane towing bridle is placed over projection 17 and the main brake 27 is adjusted, such as by check valve 52 in the brakes of Figs. 4 and 5, to move shuttle 16 forward to tension the airplane towing bridle and entire cable system. Then power in the form of air, steam, or liquid under air or gas pressure is admitted through pipes 26 to cylinders 25 to move crosshead 11. Due to the speed multiplying effect of the cable-sheave assembly, shuttle 16 travels twice as fast as crosshead 11. Since the crosshead is initially located half the distance along the accelerated run, the shuttle must travel twice the distance the crosshead does, thus the fast moving shuttle does not "catch" the crosshead until the end of the run. It is seen that during a launching, as the cable is payed-out, less and less launching cable 14 is accelerated as the run increases and when the shuttle strikes the crosshead brake, practically all of the launching cable has automatically come to rest. The required function of the buffers 21 therefore is to arrest the shuttle and a few feet of cable only at the differential speed between the shuttle and the crosshead. Immediately after the shuttle strikes the crosshead, the bar 32 is contacted by arm 31 of the crosshead 11. Brake 27 is then triggered by cable 33 to arrest the combination of the shuttle, crosshead, and attached parts that are in motion. If the brake of Fig. 4 is employed, the moving combination of the shuttle and crosshead will tend to move sheave 19 in the same direction as the movement of the combination. The movement of sheave 19 is transmitted to piston 55, and as a result tapered sleeve 56 will decrease the area of orifice 58. This action produces a constant pressure on piston 55 and gives the desired braking. The excess liquid passes through valve 59 to tank 51. In Fig. 5, the variable orifice is obtained by means of "V-shaped" slots 61 in the walls of cylinder 53. As piston 55 moves, the area of escape for the liquid in chamber 62 is decreased and thus the pressure of the liquid is constant giving the braking action.

Thus, an invention has been disclosed which attains the objects of providing a high speed catapult having low mass moving components that are arrested at one-half the full launching speed and wherein is involved a substantial departure from prior art systems. The system as shown does not disclose a reacting method for bringing the shuttle back to battery position after firing but such a method could be incorporated using any one of a variety now in use.

Obviously many modifications and variations of the present invention are possible in the light of the above teachings. It is therefore to be understood that within the scope of the appended claims the invention may be practiced otherwise than as specifically described.

What is claimed is:

1. An improved catapult comprising in combination a track mechanism, first means for holding an airplane towing bridle slidably mounted in said track mechanism, speed multiplying means, second means slidably mounted in said track mechanism and connected by said speed multiplying means to said first means for moving said first means, first brake means mounted on said second means for braking said first means at the differential speed between said first and second means at the end of the accelerated run, and second brake means for braking said first and second means to a full stop at the end of the accelerated run.

2. An improved catapult comprising in combination a linear track, first means for holding an airplane towing bridle slidably mounted on said track, a 2:1 speed multiplying means, second means slidably mounted on said track at a point one-half the length of the track and connected by said speed multiplying means to said first means, power means for moving said second means, first brake means mounted on said second means for braking said first means at the differential speed between said first and second means when said first means contacts said second means at the end of said track, and second brake means for arresting said first and second means at the end of the track.

3. An improved catapult comprising in combination a linear track equal in length to that of the desired acceleration run and having start and finish ends, first means for holding an airplane towing bridle slidably mounted at the start end of said track, a 2:1 speed multiplying means, second means slidably mounted on said track located initially half way between said start and finish ends and connected by said speed multiplying means to said first means, power means connected to move said second means, a first buffer mounted on said first means and a second buffer mounted on said second means whereby upon contact between said first means and second means near the finish end of said track said first means is arrested at the differential speed between said first and second means, and a variable orifice combination brake and tensioner connected to said second means for tensioning the towing bridle at the start of a run and to arrest the first and second means at the end of a run.

4. An improved catapult for launching an aircraft along an accelerated run comprising in combination: a linear track equal in length to the accelerated run and having start and finish ends, first means for holding an airplane towing bridle slidably mounted and located initially at the start end of said track, second means slidably mounted on said track located initially half way between said start and finish ends, a first sheave rotatably mounted on said second means, a variable orifice combination brake and tensioner, a second sheave connected to said brake and tensioner, a cable reeved over said first and and second sheaves and having one end connected to said first means and a dead end whereby upon movement of said second means said first means moves twice as fast as said second means, a first buffer mounted on said first means and a second buffer mounted on said second means whereby upon contact of said first and second means near the finish end of said track said first means is arrested at the differential speed between said first and second means, power means connected to move said second means, and means located at the finish end of the track for initiating operation of said variable orifice combination brake and tensioner upon being contacted by said second means.

5. An improved catapult for launching an aircraft along an accelerated run comprising in combination: a linear track having start and finish ends and equal in length to the accelerated run, first means for holding an airplane towing bridle slidably mounted on and normally located at the start end of said track, second means slidably mounted on said track and normally located half way between said start and finish ends, power means connected for moving said second means, a first buffer mounted on said first means and a second buffer mounted on said second means whereby upon contact of said first and second means near the finish end of said track said first means is arrested at the differential speed between said first and second means, a first sheave rotatably mounted on said second means, a launching cable reeved over said first sheave and having one end connected to said first means and a dead end, a second sheave over which a section near the dead end of the launching cable is reeved, a variable orifice combination brake and tensioner connected to said second sheave for tensioning the towing bridle and launching cable at the start of a run and upon triggering for arresting said first and second means at the end of the run, and third means at the finish end of the track for triggering said variable orifice combination brake and tensioner when said third means is contacted by said second means.

6. An improved catapult for launching an aircraft along an accelerated run comprising in combination: a linear track, projection possessing means slidably mounted on said track, speed multiplying means, propelling means mounted on said track and connected by said speed multiplying means for moving said projection possessing means, buffer means on said projection possessing means and said propelling means for arresting said projection possessing means at the end of the run at the speed difference between said projection possessing means and said propelling means, and braking means for braking said propelling means after the arresting action of said buffer means.

7. An improved catapult for launching an aircraft along an eccelerated run comprising in combination: a linear track having start and finish ends, first means slidably mounted on said track and having a non-run position at the start end of said track, a projecting lug mounted on said first means for holding an aircraft towing bridle, second means slidably mounted on said track and having a non-run position midway between said start and finish ends, means interconnecting said first and second means whereby upon movement of said second means at one speed said first means will move at a speed which is twice said one speed, power means for moving said second means, a first buffer mounted on said first means and a second buffer mounted on said second means whereby upon contact of said first and second means near the finish end of said track said first means is arrested at the speed differential between said first and second means, and brake means for arresting said first and second means at the finish end of said track.

8. A catapult comprising: a track having start and finish ends, projection possessing means mounted on said track and having a non-run position at the start end of said track, speed multiplying means for producing a speed multiplying action of N times, crosshead means slidably mounted on said track and having a non-run position from the finish end of said track which is 1/N of the distance between said start and finish ends, propelling means for moving said crosshead means, and means connecting said speed multiplying means with said crosshead means and said projection possessing means whereby said projection possessing means moves N times as fast as said crosshead means.

9. The catapult of claim 8 wherein buffer means are provided on said projection possessing means and said crosshead means whereby said projection possessing means is arrested at the speed differential between said projection possessing means and said crosshead means at the finish end of said track.

References Cited in the file of this patent

UNITED STATES PATENTS

| | | |
|---|---|---|
| 1,535,475 | Jeansen | Apr. 28, 1925 |
| 1,960,264 | Heinkel | May 29, 1934 |
| 2,207,806 | Hollmann | July 16, 1940 |
| 2,240,947 | Wilson | May 6, 1941 |